United States Patent
Bincoletto et al.

(10) Patent No.: US 6,928,760 B2
(45) Date of Patent: Aug. 16, 2005

(54) SUPPORT ARRANGEMENT FOR LIGHTING DEVICES FOR THE ILLUMINATION OF THE NUMBER PLATE OF MOTOR-VEHICLES

(75) Inventors: Frederico Bincoletto, S. Biagio di Callalta (IT); Giovanni Garbet, Conegliano (IT)

(73) Assignee: Plastal S.p.A., Pordenone (IT)

( * ) Notice: Subject to any disclaimer, the term of this patent is extended or adjusted under 35 U.S.C. 154(b) by 0 days.

(21) Appl. No.: 10/333,279

(22) PCT Filed: Jun. 1, 2001

(86) PCT No.: PCT/EP01/06265
§ 371 (c)(1),
(2), (4) Date: Apr. 29, 2003

(87) PCT Pub. No.: WO02/06085
PCT Pub. Date: Jan. 24, 2002

(65) Prior Publication Data
US 2004/0010951 A1 Jan. 22, 2004

(30) Foreign Application Priority Data
Jul. 18, 2000 (IT) .................................... PN2000A0043

(51) Int. Cl.⁷ .............................................. G09F 13/08
(52) U.S. Cl. ............................. 40/204; 40/576; 40/579
(58) Field of Search ......................... 40/204, 579, 576, 40/564; 362/800

(56) References Cited

U.S. PATENT DOCUMENTS

| | | | | | |
|---|---|---|---|---|---|
| 4,457,089 A | * | 7/1984 | Phillips, Jr. | ................... | 40/544 |
| 5,542,200 A | * | 8/1996 | Matsuoka | ..................... | 40/204 |
| 5,572,812 A | * | 11/1996 | Mastuoka | ..................... | 40/204 |
| 5,747,363 A | | 5/1998 | Wei et al. | | |

FOREIGN PATENT DOCUMENTS

| | | | | | |
|---|---|---|---|---|---|
| JP | 08123343 A | * | 5/1996 | ........... | G09F/13/04 |
| JP | 10129344 A | * | 5/1998 | ............ | B60Q/1/56 |

OTHER PUBLICATIONS

Patent Abstracts of Japan, vol. 1998, No. 10, Aug. 31, 1998 & JP 10 129344 A (Inoue Katsuo), May 19, 1998.
Patent Abstracts of Japan, vol. 1996, No. 09, Sep. 30, 1996 & JP 08 123343 A (World Auto Plate KK), May 17, 1996.

* cited by examiner

*Primary Examiner*—Cassandra Davis
(74) *Attorney, Agent, or Firm*—Wenderoth, Lind & Ponack, L.L.P.

(57) ABSTRACT

A sandwich structure is formed by a base layer and a protective layer that are assembled together through the interposition of a spacer layer therebetween, in such a manner as to form a tightly sealed, insulated hollow space, in which high-luminosity LEDs are arranged to illuminate the number plate through transparent portions of the protective layer. The LEDs are adapted to be connected to a power supply through conductive paths provided on the inner surface of the base layer.

6 Claims, 4 Drawing Sheets

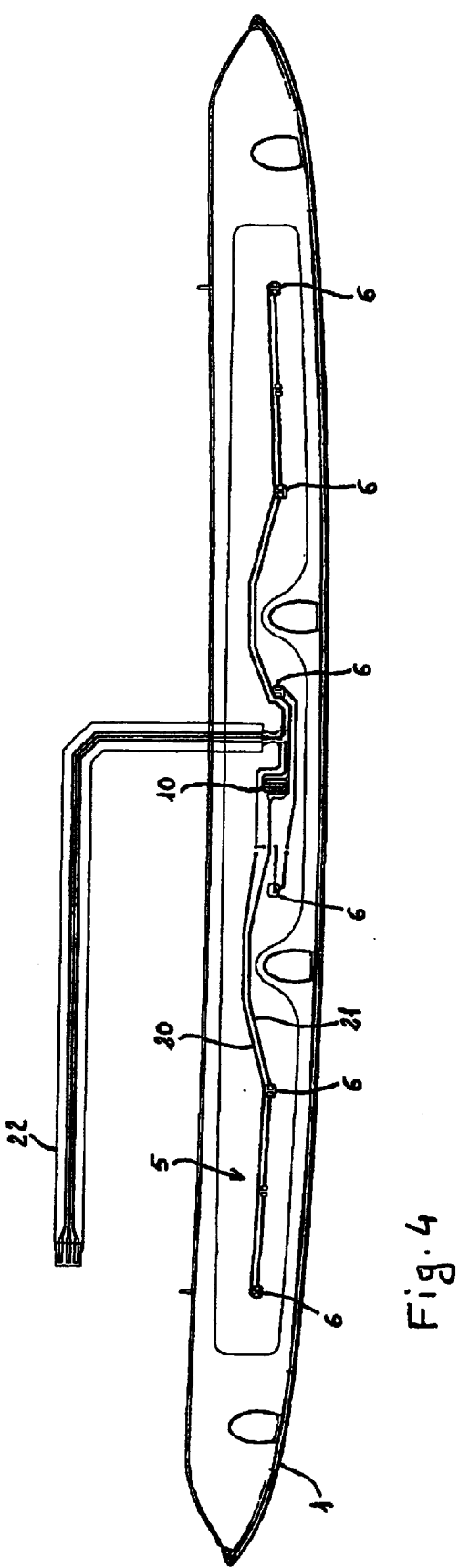

SUPPORT ARRANGEMENT FOR LIGHTING DEVICES FOR THE ILLUMINATION OF THE NUMBER PLATE OF MOTOR-VEHICLES

BACKGROUND OF THE INVENTION

The present invention refers to a support arrangement for lighting devices adapted to illuminate a license plate of motor-vehicles, in particular motor-cars.

As is generally known, the license plate provided in the rear of motor-cars is capable of being illuminated by means of incandescent lamps, which are mounted on at least a support member attached to the body of the vehicle.

In particular, generally known in the art is the practice based on the use of an elongated support body which is attached to the rear trunk of the vehicle, and which, further to the lamps for the illumination of the license plate, may also support a manually actuatable electro-mechanical device for opening the trunk. In other words, a manually actuatable lever is provided there to operate a switch, which in turn is adapted to energize an electric motor, or the like, to release the lock fastening the trunk.

In the above cited prior-art solutions, the lamps need to be protected by means of glass coverings, or the like, mounted on the support member. Furthermore, the electrical connections of the same lamps and the above mentioned trunk unlocking device are implemented with the use of wirings, or metal strips, as this is described for instance in EP-A-0 976 617.

In any case, the assembly of the whole support member turns out to be undesirably laborious, i.e., demanding, and expensive on an industrial scale.

Furthermore, the support member is scarcely reliable due to moisture which quite easily penetrates thereinto in areas corresponding to the glass coverings used as a protection. The moisture causes the electrical contacts to undergo corrosion/oxidation problems and this obviously gives rise to conditions of malfunction. This phenomenon is even made worse by the combination of such moisture with the heat generated by the incandescent lamps.

Apart from the above described drawbacks, it should be noticed that the traditional support members for lamps used to illuminate the number plate of motor-vehicles are made up by a plurality of relatively bulky component parts that undesirably affect the aesthetics of the entire support member and, as a consequence, of the associated vehicle.

Furthermore, the bulkiness of the support member sets substantial limitations on the structural and application-related versatility thereof.

SUMMARY OF THE INVENTION

It therefore is a main purpose of the present invention to provide a support arrangement for the illumination devices of the license plate of motor-vehicles, which is particularly compact, i.e., of particularly reduced bulkiness, and is of great versatility in its application.

Another purpose of the present invention is to provide a support arrangement of the above cited kind, which is particularly reliable in practical use and, in particular, is substantially insensitive to moisture.

A further purpose yet of the present invention is to provide a support arrangement of the above cited kind, which is particularly low-cost and easy to assemble.

According to the present invention, these aims are reached in a support arrangement for the illumination devices of the license plate of motor-vehicles having the characteristics as recited in the appended claims.

BRIEF DESCRIPTION OF THE DRAWINGS

Features and advantages of the present invention will be more readily understood from the description that is given below by way of non-limiting examples with reference to the accompanying drawings, in which:

FIG. 4 is a schematical, longitudinal-section view of the support arrangement of FIG. 1.

DETAILED DESCRIPTION OF THE INVENTION

Figure 1:
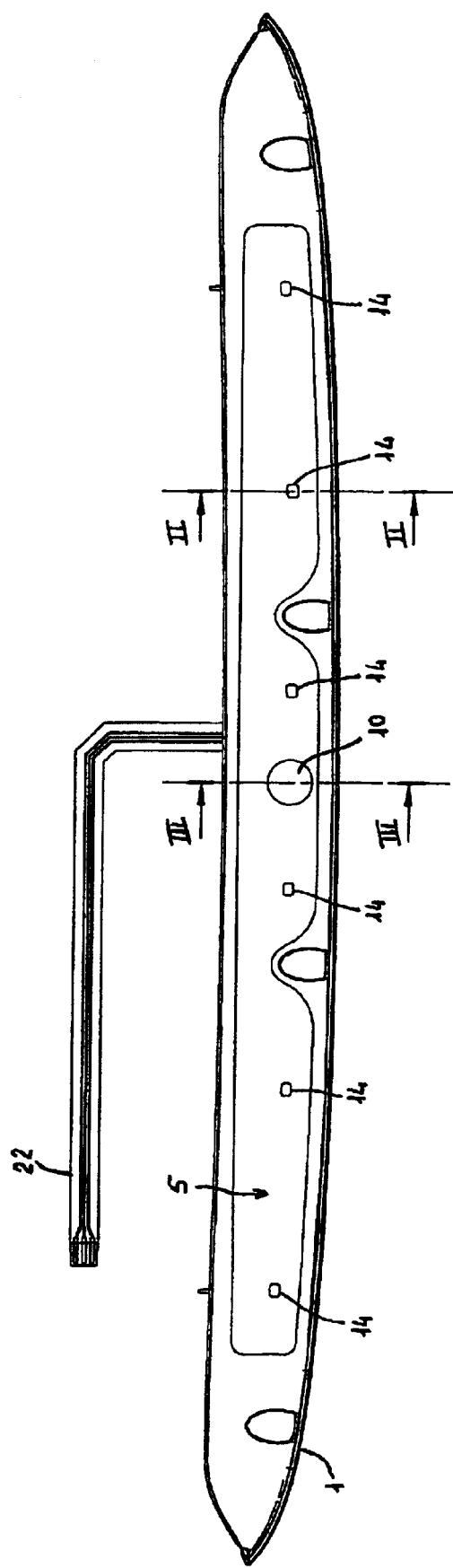
FIG. 1 is a schematical bottom view of a preferred embodiment of the support arrangement according to the present invention.
Figure 2:
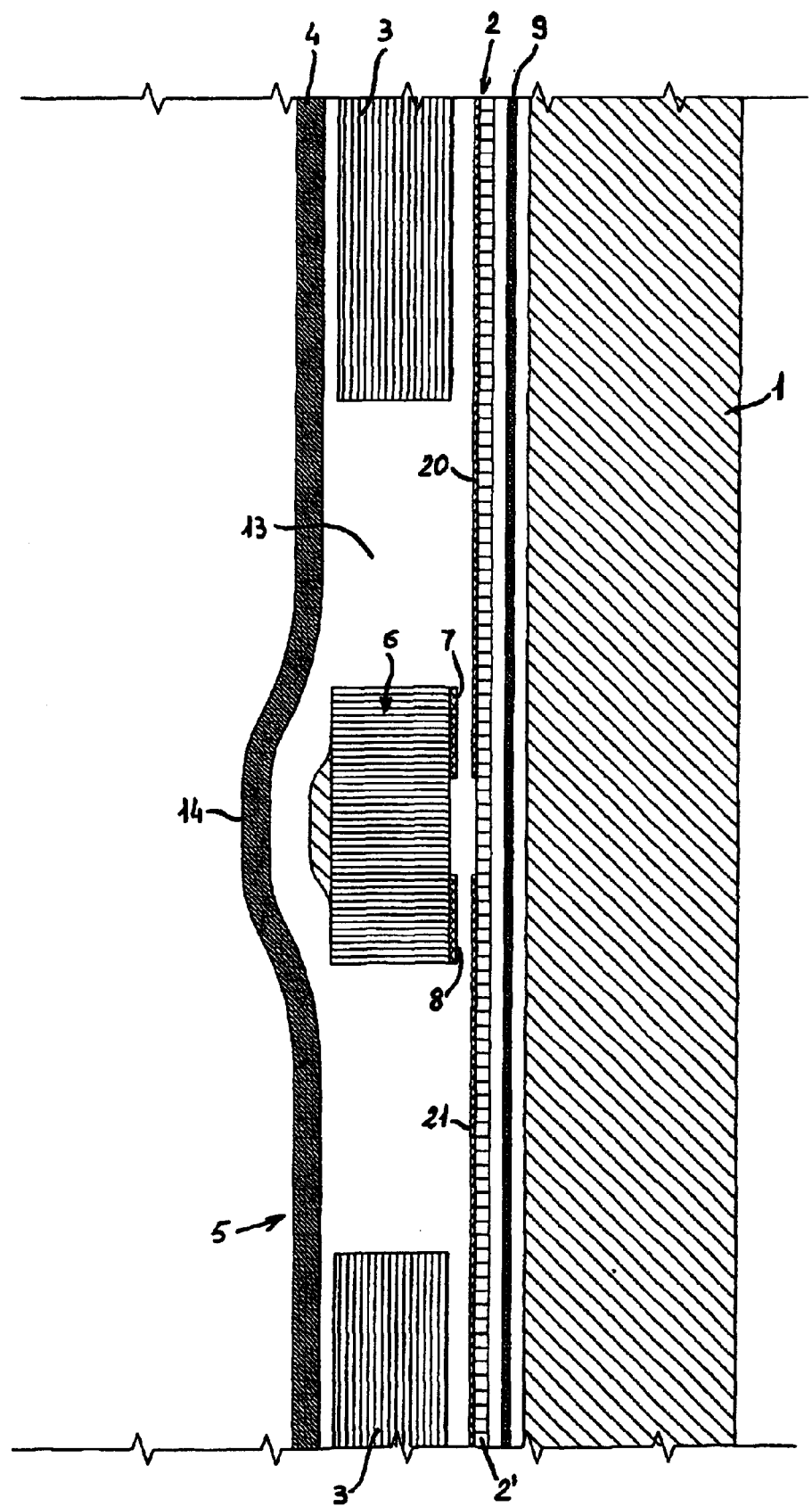
FIG. 2 is a partial, enlarged-scale view of the section II—II of FIG. 1, in which, for reasons of better comprehension, the various component parts are illustrated in a condition in which they appear to be spaced from each other.

With particular reference to FIGS. 1 and 2, the support arrangement according to the present invention calls mainly for the use of a base member 1, which may be formed directly by the same body of the vehicle, i.e., integrally therewith, but is preferably constituted by a separate, appropriately shaped member (as shown in FIGS. 1 and 4) that is in turn adapted to be attached to the body of the vehicle.

The actual support arrangement anyway comprises a sandwich structure 5, which on the one side comprises a base layer 2 and, on the opposite (outer) side, comprises a protective layer 4, for example, a polyester material.

In particular, said base layer 2 may for instance be made of such a material as the material marketed by DuPont de Nemours under the trade name of "Kapton", with a metal layer in correspondence of which there are provided electrically conductive paths 20, 21 deposited onto an outer surface 2' of an insulating material.

Between the layers 2 and 4, which are assembled together through the interposition of a layer 3 of bi-adhesive acrylic foam, or similar gluing or sticking material, a tightly sealed, insulated hollow space is created, in which there are provided one or more LEDs 6 of the high-luminosity type, preferably made according to the SMD technology and having a reduced size, i.e., requiring a minimum of space.

These LEDs 6 are distributed according to a suitable side-by-side arrangement in the structure 5 and each one of them is provided with respective electrical contacts 7, 8, each one of which is in turn in contact with an associated path 20, 21 of the base layer 2. As this may be noticed in FIG. 4, the electrically conductive paths 20, 21 extend in the composite structure 5 in such a manner as to ensure the necessary power supply to all of said LEDs 6. To this purpose, the same paths can be seen to form an appendix 22 adapted to be connected to an appropriate power supply source.

It should be further noticed that the layer 3 performs a threefold function in that it confers an adequate strength and robustness to the whole structure 5, joins the layers 2 and 4 to each other, and acts as a spacer between the same layers 2 and 4 so as to allow for the interposition of the LEDs 6.

At least a portion 14 of the protective layer 4 is substantially transparent, in correspondence of the LEDs 6, so as to enable them to adequately illuminate the number plate of the vehicle.

As it may be most easily appreciated, the support arrangement according to the present invention comes in the form of a thin multi-layer structure 5, in which the electrical connections 20, 21 and the LEDs 6, which substantially produce an intense cold light, are practically insulated in a tightly sealed manner against ambient moisture, thereby conferring a high functional reliability to the whole support arrangement.

The support structure 5, which preferably is joined to the base member 1 by depositing a layer 9 of adhesive between it and the base layer 2, has not only a practically negligible thickness, but can also be most easily cut-to-measure (by of course appropriately arranging the LEDs 6 and the related paths 20, 21 therein) so as to enable it to adapt to any size and/or configuration of the base member 1.

It will be appreciated that the above described support arrangement may be the subject of a number of modifications without departing from the scope of the present invention.

For instance, in the preferred case in which there is also provided an electric switch to operate the device for unlatching the lock of the boot of the motor-vehicle, even such a switch may be made integrally with the structure 5.

Figure 3:
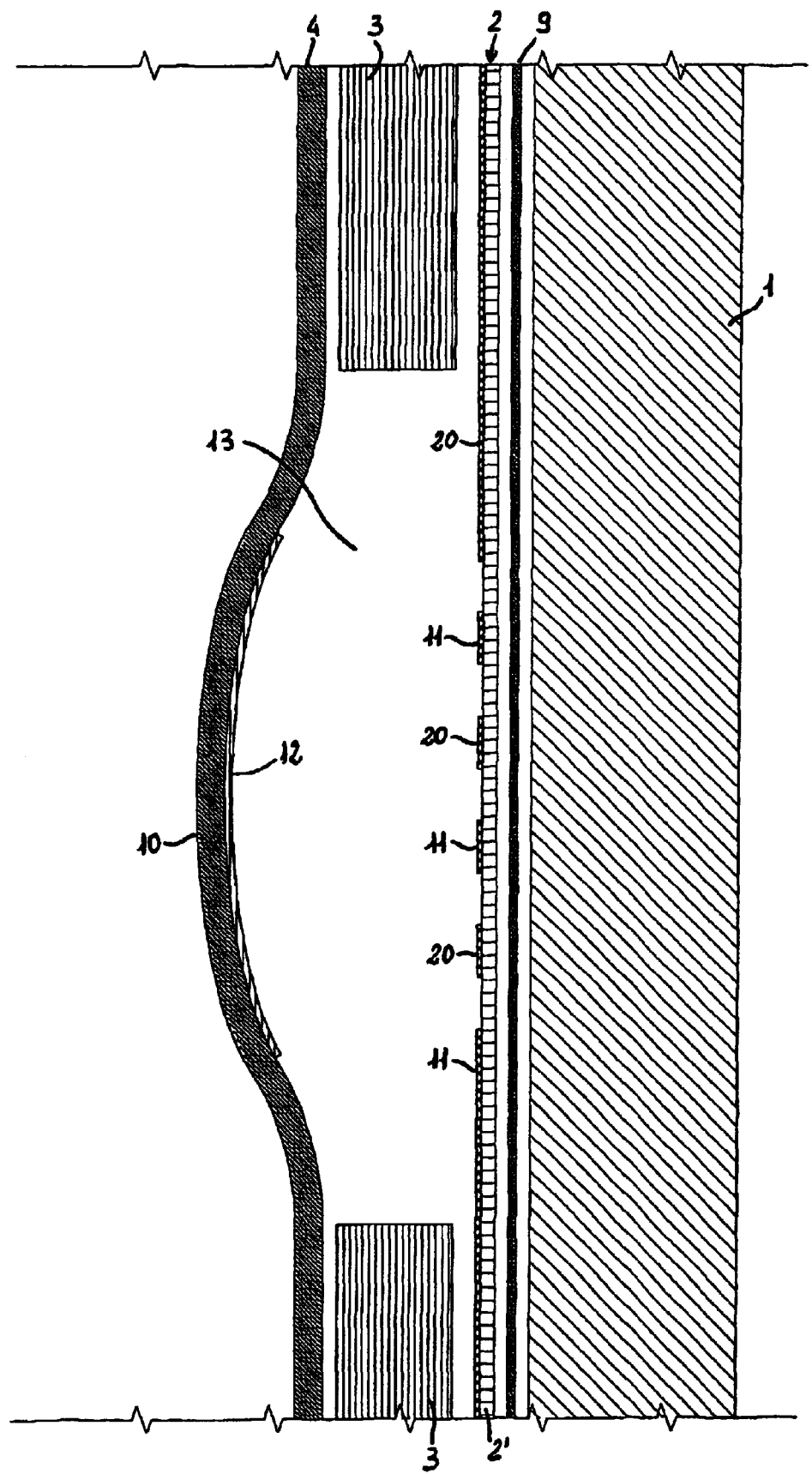
FIG. 3 is a partial, enlarged-scale view of the section III—III of FIG. 1, in which, for reasons of better comprehension, the various component parts are illustrated in a condition in which they appear to be spaced from each other.

In particular, with reference to FIGS. 1, 3 and 4, in correspondence of a predetermined zone 10 of the support structure 5, the metal layer of the base layer 2 forms respective conductive paths 11 and 20 provided in a side-by-side arrangement, which constitute respective fixed contacts of the above mentioned switch. In correspondence of said zone 10, the protective layer 4 has a so-to-say "protruding" configuration, in such a manner as to be able to be easily deformed elastically under a slight pressure of the hand. Furthermore, such a deformable portion 10 of the layer 4 is provided on its inner surface with a thin electrically conductive coating 12, for example silver, which constitutes a moving contact adapted to interconnect the fixed contacts 11 and 20 of the switch only when the above cited deformable zone 10 is depressed.

Preferably, in correspondence of said zone 10, the paths 11 and 20 are distributed according to an alternate pattern (FIG. 3), i.e., at intervals, so as to form a "comb-like" or similar configuration, thanks to which the interconnection between the fixed contacts 11 and 20 is capable of being surely and effectively established, regardless of the point of the coating 12 that is brought into contact with the base layer 2.

The electric switch 11, 12, 20, which—similarly to the LEDs 6 and the associated electrical connections 20, 21—is insulated in a tightly sealed manner inside the structure 5, is not only particularly simple and low-cost, but also particularly reliable and accurate in its operation.

It will be further appreciated that a number of further variants can be introduced in the above described support arrangement for illuminating devices. So, for instance, the conductive paths 20, 21 may be provided also, or solely, on the inner surface of the protective layer 4.

What is claimed is:

1. A support arrangement for lighting devices for the illumination of a license plate of motor-vehicles, said support arrangement comprising:

a sandwich structure adapted to be attached to a base member, wherein said sandwich structure comprises a base layer and a protective layer that are assembled together through the interposition of a spacer layer therebetween, so as to form a tightly sealed, insulated hollow space, wherein at least a high-luminosity LED is arranged in said insulated hollow space and is adapted to illuminate said license plate through at least a transparent portion of said protective layer, and wherein said LED is capable of being connected to a power supply through conductive paths provided on an inner surface of said base layer and/or an inner surface of said protective layer.

2. A support arrangement for lighting devices for the illumination of the license plate of motor-vehicles according to claim 1, further comprising an electric switch integrally formed in said hollow space of said sandwich structure, wherein said electric switch is capable of being operated manually in correspondence of a deformable zone of the protective layer.

3. A support arrangement for lighting devices for the illumination of the license plate of motor-vehicles according to claim 1, wherein said spacer layer is made of bi-adhesive acrylic foam.

4. A support arrangement for lighting devices for the illumination of the license plate of motor-vehicles according to claim 1, wherein said sandwich structure is adapted to be joined to said base member by means of a layer of adhesive.

5. A support arrangement for lighting devices for the illumination of the license plate of motor-vehicles according to claim 2, wherein said electric switch comprises at least one of said conductive paths and an electrically conductive coating provided on the inner surface of said protective layer.

6. A support arrangement for lighting devices for the illumination of the license plate of motor-vehicles according to claim 5, wherein said electric switch comprises said at least one of said conductive paths and a second conductive path, wherein, in correspondence of said deformable zone of the protective layer, said at least one of said conductive paths and said second conductive path are distributed according to an alternate pattern on the inner surface of said base layer, so as to form a comb-like configuration adapted to be contacted by said electrically conductive coating.

* * * * *